(12) United States Patent
Liu et al.

(10) Patent No.: US 12,608,913 B2
(45) Date of Patent: Apr. 21, 2026

(54) METHOD, DEVICE, SYSTEM AND MEDIUM FOR CLASSIFYING GREEN-BLUE-GRAY INFRASTRUCTURE

(71) Applicant: SOUTHERN UNIVERSITY OF SCIENCE AND TECHNOLOGY, Shenzhen (CN)

(72) Inventors: Junguo Liu, Shenzhen (CN); Jinlin Jia, Shenzhen (CN); Wenhui Cui, Shenzhen (CN)

(73) Assignee: SOUTHERN UNIVERSITY OF SCIENCE AND TECHNOLOGY, Shenzhen (CN)

( * ) Notice: Subject to any disclaimer, the term of this patent is extended or adjusted under 35 U.S.C. 154(b) by 303 days.

(21) Appl. No.: 18/556,730

(22) PCT Filed: Nov. 29, 2022

(86) PCT No.: PCT/CN2022/134944
§ 371 (c)(1),
(2) Date: Oct. 23, 2023

(87) PCT Pub. No.: WO2023/116359
PCT Pub. Date: Jun. 29, 2023

(65) Prior Publication Data
US 2024/0371133 A1 Nov. 7, 2024

(30) Foreign Application Priority Data
Dec. 20, 2021 (CN) .......................... 202111565957.7

(51) Int. Cl.
*G06V 10/764* (2022.01)
*G06V 10/56* (2022.01)
*G06V 20/10* (2022.01)

(52) U.S. Cl.
CPC ............ *G06V 10/764* (2022.01); *G06V 10/56* (2022.01); *G06V 20/194* (2022.01)

(58) Field of Classification Search
CPC .... G06V 10/764; G06V 10/56; G06V 20/194; G06V 10/74; G06V 20/17; G06T 7/90; Y02A 30/60
See application file for complete search history.

(56) References Cited

U.S. PATENT DOCUMENTS

| | | | | |
|---|---|---|---|---|
| 2015/0371115 A1* | 12/2015 | Marchisio | .............. | G06V 20/13 |
| | | | | 382/159 |
| 2023/0353763 A1* | 11/2023 | Klement | ............ | G01C 21/3852 |

FOREIGN PATENT DOCUMENTS

| | | | |
|---|---|---|---|
| CN | 109740562 A | * | 5/2019 |
| CN | 114359630 A | | 4/2022 |
| KR | 20210061817 A | | 5/2021 |

OTHER PUBLICATIONS

International Search Report issued on Jan. 18, 2023, in corresponding International Application No. PCT/CN2022/134944, 3 pages.
(Continued)

*Primary Examiner* — Edward Park
*Assistant Examiner* — Alexander Joseph Vaughn
(74) *Attorney, Agent, or Firm* — Maier & Maier, PLLC

(57) ABSTRACT

A method, device, system, and medium for classifying green-blue-gray infrastructure. The method includes obtaining a multispectral photo corresponding to a target area, and obtaining an image set of a target and a color orthophoto, based on the multispectral photo; obtaining a sample file based on the color orthophoto, and obtaining a classification result of the green-blue-gray infrastructure corresponding to the target area based on the image set of the target and the sample file. The embodiments can obtain the image set of the target and the color orthophoto based on the multispectral photo corresponding to the target area and combine the
(Continued)

sample file obtained from the color orthophoto with the image set of the target to obtain the classification result of the green-blue-gray infrastructure corresponding to the target area, thereby improving the accuracy and efficiency for classifying the green-blue-gray infrastructure.

14 Claims, 1 Drawing Sheet

(56) References Cited

OTHER PUBLICATIONS

Yang, et al., "Crop Classification Method of UVA Multispectral Remote Sensing Based on Deep Semantic Segmentation", Transaction of the Chinese Society for Agricultural Machinery, vol. 52, No. 3, Mar. 31, 2021, ISSN: 1000-1298, pp. 185-192, 8 pages, (partial English translation provided).

* cited by examiner

METHOD, DEVICE, SYSTEM AND MEDIUM FOR CLASSIFYING GREEN-BLUE-GRAY INFRASTRUCTURE

FIELD

The present disclosure relates to the technical field of image processing, in particular to a method, device, system and medium for classifying green-blue-gray infrastructure.

BACKGROUND

At present, more types and larger area of urban infrastructure, including water bodies, trees, grasslands, bare lands, buildings, roads, etc., are emerging with the continuous development of cities. There are significant differences in the rainwater-utilization performance of different infrastructure. Therefore, relevant urban planners need to assist cities in planning and construction based on the rainwater-utilization performance of different types of infrastructure. However, existing methods for classifying infrastructure in cities generally have low accuracy and efficiency. How to improve the accuracy and efficiency for classifying green-blue-gray infrastructure is an urgent problem to be solved.

SUMMARY

The present disclosure primarily intends to provide a method, device, system and medium for classifying green-blue-gray infrastructure, aiming to solve the problem of how to improve the accuracy and efficiency for classifying green-blue-gray infrastructure.

To achieve the above intention, the present disclosure provides a method for classifying green-blue-gray infrastructure, which comprises following steps:

obtaining a multispectral photo corresponding to a target area, and obtaining an image set of a target with multispectral bands, digital surface model, and normalized difference vegetation index, and a color orthophoto based on the multispectral photo; and obtaining a sample file based on the color orthophoto, and obtaining a classification result of the green-blue-gray infrastructure corresponding to the target area based on the image set of the target and the sample file.

Furthermore, the step, obtaining the image set of the target and the color orthophoto based on the multispectral photo, comprises:

performing a two-dimensional rebuilding operation on the multispectral photo, and obtaining the image set of the target and the color orthophoto based on the multispectral photo performed the two-dimensional rebuilding operation and a preset resolution.

Furthermore, the sample file comprises a training sample and a validation sample, and the step, obtaining the sample file based on the color orthophoto, comprises:

generating a mesh image based on a preset mesh spacing, and overlapping the mesh image with the color orthophoto to obtain a color mesh orthophoto;

identifying a mesh-point attribute corresponding to each mesh point in the color mesh orthophoto, and obtaining the training sample based on the mesh-point attribute; and deflecting the mesh image of the color mesh orthophoto to obtain the validation sample.

Furthermore, the step, obtaining the classification result of the green-blue-gray infrastructure corresponding to the target area based on the image set of the target and the sample file, comprises:

performing a partition on the image set of the target based on spectral similarity to obtain a shape object, and calculating and obtaining a pre-classification result of the green-blue-gray infrastructure based on the training sample of the sample file and a light-waveband image value of the corresponding shape object; and performing an accuracy evaluation on the pre-classification result of the green-blue-gray infrastructure based on the validation sample of the sample file to obtain an accuracy-evaluation result, and determining the classification result of the green-blue-gray infrastructure based on the accuracy-evaluation result.

Furthermore, the step, determining the classification result of the green-blue-gray infrastructure based on the accuracy-evaluation result, comprises:

comparing the accuracy-evaluation result with a preset accuracy to obtain a comparison result;

if the comparison result is that the accuracy-evaluation result is not less than the preset accuracy, determining the pre-classification result of the green-blue-gray infrastructure as the classification result of the green-blue-gray infrastructure; and if the comparison result is that the accuracy-evaluation result is less than the preset accuracy, presetting and processing the mesh image and the image set of the target to obtain an optimal mesh image and an optimal image set of the target, and executing following step: overlapping the mesh image with the color orthophoto to obtain the color mesh orthophoto.

Furthermore, the step, presetting and processing the mesh image and the image set of the target to obtain the optimal mesh image and the optimal image set of the target, comprises:

performing a zoom-out operation on a mesh spacing corresponding to the mesh image to obtain mesh images with a first preset number, and performing a first preset operation on each mesh image respectively to obtain the optimal mesh image; and performing an increase or decrease operation on the number of images in the image set of the target to obtain image sets of the target with a second preset number, and performing a second preset operation on each image set of the target based on the optimal mesh image to obtain the optimal image set of the target.

Furthermore, after the step obtaining the sample file based on the color orthophoto, and obtaining the classification result of the green-blue-gray infrastructure corresponding to the target area based on the image set of the target and the sample file, the method further comprises:

generating a classification map corresponding to the target area based on the classification result of the green-blue-gray infrastructure, and providing a rainwater-utilization analysis data corresponding to the target area based on the classification map.

Furthermore, to achieve the above intention, the present disclosure further provides a device for classifying the green-blue-gray infrastructure, the device comprises:

an obtaining module, configured to obtain a multispectral photo corresponding to a target area, and obtain an image set of a target, and a color orthophoto based on the multispectral photo; and a classifying module, configured to obtain a sample file based on the color orthophoto, and obtain a classification result of the green-blue-gray infrastructure corresponding to the target area based on the image set of the target and the sample file.

Furthermore, the obtaining module further comprises a two-dimensional rebuilding module, which is configured to:

perform a two-dimensional rebuilding operation on the multispectral photo, and obtain an image set of the target and the color orthophoto, based on the multispectral photo after the two-dimensional rebuilding operation and a preset resolution. Furthermore, the classifying module further comprises a generating module, which is configured to:

generate a mesh image based on a preset mesh spacing, and overlap the mesh image with the color orthophoto to obtain a color mesh orthophoto;

identify a mesh-point attribute corresponding to each mesh point in the color mesh orthophoto, and obtain a training sample based on the mesh-point attribute; and deflect the mesh image in the color mesh orthophoto to obtain a validation sample.

Furthermore, the classifying module is further configured to:

perform a partition on the image set of the target based on spectral similarity to obtain a shape object, and calculate and obtain a pre-classification result of the green-blue-gray infrastructure based on the training sample in the sample file and a light-waveband image value of the corresponding shape object; and perform an accuracy evaluation on the pre-classification result of the green-blue-gray infrastructure based on the validation sample in the sample file to obtain an accuracy-evaluation result, and determine a classification result of the green-blue-gray infrastructure based on the accuracy-evaluation result.

Furthermore, the classifying module is further configured to:

compare the accuracy-evaluation result with a preset accuracy to obtain a comparison result;

if the comparison result is that the accuracy-evaluation result is not less than the preset accuracy, determine the pre-classification result of the green-blue-gray infrastructure as the classification result of the green-blue-gray infrastructure; and if the comparison result is that the accuracy-evaluation result is less than the preset accuracy, preprocess the mesh image and the image set of the target to obtain an optimal mesh image and an optimal image set of the target, and execute following step: overlapping the mesh image with the color orthophoto to obtain a color mesh orthophoto.

Furthermore, the classifying module further comprises an optimization module, which is configured to:

perform a zoom-out operation on a mesh spacing corresponding to the mesh image to obtain mesh images with a first preset number, and perform a first preset operation on each mesh image respectively to obtain the optimal mesh image; and perform an increase or decrease operation on the number of images in the image set of the target to obtain image sets of the target with a second preset number, and perform a second preset operation on each image set of the target based on the optimal mesh image to obtain the optimal image set of the target.

Furthermore, the classifying module further comprises an analysis module, which is configured to:

generate a classification map corresponding to the target area based on the classification result of the green-blue-gray infrastructure, and provide a rainwater-utilization analysis data corresponding to the target area based on the classification map.

Furthermore, to achieve the above intention, the present disclosure further provides a system for classifying the green-blue-gray infrastructure, the system comprises a memory, a processor, and a program for classifying the green-blue-gray infrastructure stored on the memory and operable on the processor; wherein the steps of the method for classifying the green-blue-gray infrastructure mentioned above are implemented when the program is executed by the processor.

Furthermore, to achieve the above intention, the present disclosure further provides a medium, the medium is a computer-readable storage medium, on which a program for classifying the green-blue-gray infrastructure is stored, wherein the steps of the method for classifying the green-blue-gray infrastructure mentioned above are implemented when the program is executed by the processor.

The method for classifying a green-blue-gray infrastructure provided by the present disclosure comprises: obtaining a multispectral photo corresponding to a target area, and obtaining an image set of a target and a color orthophoto, based on the multispectral photo: obtaining a sample file based on the color orthophoto, and obtaining a classification result of the green-blue-gray infrastructure corresponding to the target area based on the image set of the target and the sample file. The present disclosure obtains the image set of the target and the color orthophoto based on the multispectral photo corresponding to the target area, and combines the sample file obtained from the color orthophoto with the image set of the target to obtain the classification result of the green-blue-gray infrastructure corresponding to the target area, thereby improving the accuracy and efficiency for classifying the green-blue-gray infrastructure.

The implementations, functional features, and advantages of an intention of the present disclosure is further explained by combining the embodiments, with reference to the accompanying drawings.

DETAILED DESCRIPTION OF EMBODIMENTS

It should be understood that the specific embodiments described here are only intended to explain the present disclosure and are not intended to limit the present disclosure.

Figure 1:
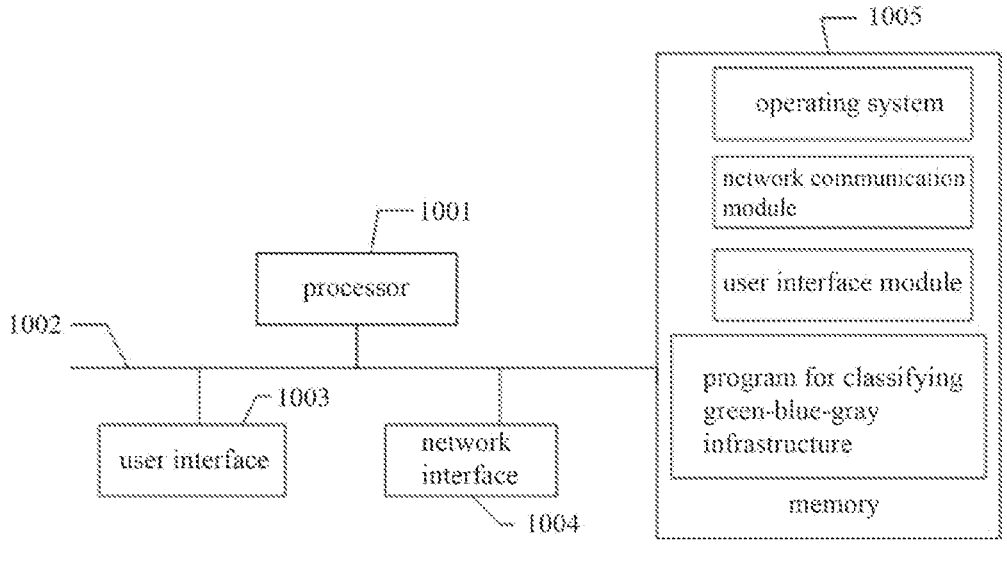
FIG. 1 is a schematic diagram of a structure of a device with a hardware-operating environment involved in the embodiments of the present disclosure.

As shown in FIG. 1, FIG. 1 is a schematic diagram of a structure of a device with a hardware-operating environment involved in the embodiments of the present disclosure.

The device in the embodiments of the present disclosure may be a PC (Personal Computer, PC) device or a sever device.

As shown in FIG. 1, the device may comprise: a processor 1001 such as a CPU (Central Processing Unit, CPU), a network interface 1004, a user interface 1003, a memory 1005, and a communication bus 1002. Among them, the communication bus 1002 is configured to achieve a connection and communication between these components. The user interface 1003 may include a display screen (Display), and an input unit such as a keyboard; and optionally the user interface 1003 may also include a standard wired interface, and a standard wireless interface. Optionally the network interface 1004 may include a standard wired interface, and a standard wireless interface (such as a WI-FI interface). The memory 1005 may be a high-speed RAM (Random Access Memory, RAM) memory, or a non-volatile memory such as a disk memory. Optionally the memory 1005 may also be a memory device independent of the aforementioned processor 1001.

Those skilled in the art can understand that, the structure of the device shown in FIG. 1 does not constitute a limitation on the device, and can include more or fewer components than shown in FIG. 1, or can combine some components, or can arrange different components.

As shown in FIG. 1, the memory 1005, as a computer storage medium, may include an operating system, a network communication module, a user interface module, and a program for classifying a green-blue-gray infrastructure.

Among them, the operating system is a program that manages and controls portable devices and software resources for classifying the green-blue-gray infrastructure, supporting an operation of the network communication module, the user interface module, the classification program of the green-blue-gray infrastructure, and other programs or software: the network communication module is configured to manage and control the network interface 1004; the user interface module is configured to manage and control the user interface 1003.

In the device for classifying the green-blue-gray infrastructure shown in FIG. 1, the device for classifying the green-blue-gray infrastructure calls the classification program for the green-blue-gray infrastructure stored in the memory 1005 through the processor 1001, and executes following operations of the methods for classifying the green-blue-gray infrastructure in various embodiments described below.

Based on the above hardware structure, a first embodiment of a method for classifying the green-blue-gray infrastructure of the present disclosure is provided.

Figure 2:
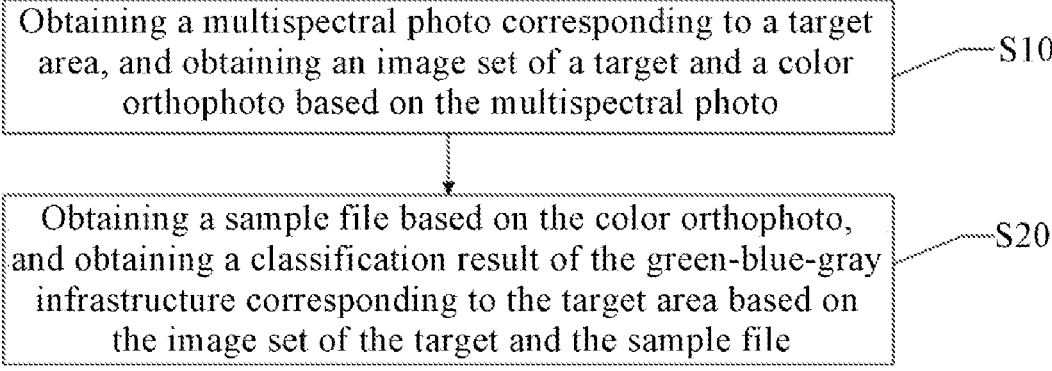
FIG. 2 is a flowchart of a method for classifying a green-blue-gray infrastructure in a first embodiment of the present disclosure.

Referring to FIG. 2, FIG. 2 is a flowchart of the method for classifying the green-blue-gray infrastructure in the first embodiment of the present disclosure, and the method comprises:

step S10, obtaining a multispectral photo corresponding to a target area, and obtaining an image set of a target, and a color orthophoto based on the multispectral photo;

step S20, obtaining a sample file based on the color orthophoto, and obtaining a classification result of the green-blue-gray infrastructure corresponding to the target area based on the image set of the target and the sample file.

The method for classifying the green-blue-gray infrastructure in the present embodiment is applied to a device for classifying the green-blue-gray infrastructure of urban planning organizations. The device for classifying the green-blue-gray infrastructure may be a terminal or a PC device. For convenience in description, the device for classifying the green-blue-gray infrastructure is used as an example for description: the device for classifying the green-blue-gray infrastructure obtains a multispectral photo corresponding to a target area, and performs a two-dimensional rebuilding operation on the multispectral photo, then obtains an image set of a target and a color orthophoto based on the multispectral photo performed through the two-dimensional rebuilding operation and a preset resolution. The device for classifying the green-blue-gray infrastructure generates a mesh image based on a preset mesh spacing, and overlaps the mesh image with the color orthophoto to obtain a color mesh orthophoto. The device for classifying the green-blue-gray infrastructure identifies a mesh-point attribute corresponding to each mesh point in the color mesh orthophoto, and obtains a training sample based on the mesh attribute, then deflects the mesh image in the color mesh orthophoto to obtain a validation sample. The device for classifying the green-blue-gray infrastructure performs a partition on the image set of the target based on spectral similarity to obtain a shape object. Based on the mesh-point attribute and a light-waveband image value of the corresponding shape object of the training sample in the sample file, a pre-classification result of the green-blue-gray infrastructure is calculated; then based on the pre-classification result of the green-blue-gray infrastructure and the validation sample in the sample file, performing an accuracy evaluation to obtain an accuracy-evaluation result. Based on the accuracy-evaluation result, determining a classification result of the green-blue-gray infrastructure. It should be noted that, the sample file comprises the training sample and the validation sample; 7 types of the infrastructure set by relevant research and development personnel include water bodies, trees and shrubs, grasslands, green roofs, bare lands, buildings, and roads, among them, the water bodies are blue infrastructure, the trees and shrubs, grasslands, green roofs, and bare lands are green infrastructure, and the buildings and roads are gray infrastructure.

The method for classifying a green-blue-gray infrastructure provided by the present disclosure comprises obtaining a multispectral photo corresponding to a target area, and obtaining an image set of a target and a color orthophoto, based on the multispectral photo; obtaining a sample file based on the color orthophoto, and obtaining a classification result of the green-blue-gray infrastructure corresponding to the target area based on the image set of the target and the sample file. The present disclosure obtains the image set of the target and the color orthophoto based on the multispectral photo corresponding to the target area, and combines the sample file obtained from the color orthophoto with the image set of the target to obtain the classification result of the green-blue-gray infrastructure corresponding to the target area, thereby improving the accuracy and efficiency for classifying the green-blue-gray infrastructure.

The following provides a detailed explanation of each step:

step S10, obtaining a multispectral photo corresponding to a target area, and obtaining an image set of a target and a color orthophoto based on the multispectral photo.

In the present embodiment, through photographing a target area under suitable weather conditions by a drone with a function of taking multispectral photos, the device for classifying the green-blue-gray infrastructure obtains a multispectral photo corresponding to the target area, and obtains an image set of a target and a color orthophoto, based on the multispectral photo. For example, relevant researchers determine a target area to be studied based on actual situations, and use a drone with a function of taking multispectral photos to fly over a ground of the target area at a preset height to photograph the target area, and then send the multispectral photo corresponding to the target area taken by the drone to the device for classifying the green-blue-gray infrastructure. When the device for classifying the green-blue-gray infrastructure obtains the multispectral photo corresponding to the target area, based on the multispectral photo, the device obtains an image set of the target and a color orthophoto corresponding to the target area. It should be noted that, the multispectral photo refers to a photo containing many bands, sometimes only three bands (such as a color image), but sometimes it contains many more bands, even hundreds of bands. Each band is a grayscale, which represents a scene brightness obtained according to sensitivity of a sensor used to generate the band. In the multispectral photograph, each pixel is relevant a numeric string (i.e., a vector) of pixels in different bands. The image set of the target includes a blue band image, a green band image, a red band image, a red edge band image, a near-infrared band image, a Normalized Difference Vegetation Index (NDVI) image, and a Digital Surface Model (DSM) image. Among them, the NDVI image is a sort of image that detects vegetation growth status, vegetation coverage, and elimination of partial radiation errors, DSM refers to a ground elevation model that comprises a height of surface buildings, bridges, trees, and etc., that is, the DSM image refers to a digital surface model image. The color orthophoto refers to a color top view of the target area photographed by the drone from above.

In some embodiments, the step S10 comprises:

step a, performing a two-dimensional rebuilding operation on the multispectral photo, and obtaining an image set of a target and a color orthophoto, based on the multispectral photo performed the two-dimensional rebuilding operation thereon and a preset resolution.

In this step, the device for classifying the green-blue-gray infrastructure performs the two-dimensional rebuilding operation on the multispectral photo corresponding to the target area, and obtains the image set of the target and the color orthophoto based on the multispectral photo performed the two-dimensional rebuilding operation thereon and the preset resolution. Among them, the preset resolution may be 6 cm, 6.5 cm, 8 cm, or 10 cm, etc. For example, relevant researchers set the preset resolution of 6 cm, and the device for classifying the green-blue-gray infrastructure inputs the multispectral photo corresponding to the target area into a DJI Terra or a similar image-mosaic software to perform the two-dimensional rebuilding operation on the multispectral photo, and obtains the blue band image, the green band image, the red band image, the red edge band image, the near-infrared band image, the NDVI image, the DSM image and the color orthophoto, with a resolution of 6 cm, respectively.

Step S20, obtaining a sample file based on the color orthophoto, and obtaining a classification result of the green-blue-gray infrastructure corresponding to the target area based on the image set of the target and the sample file.

In the present embodiment, the device for classifying the green-blue-gray infrastructure based on the color ortho-photo, obtains the sample file through eCognition software and Arc GIS software. The device selects one or more images from the image set of the target, including the blue band image, the green band image, the red band image, the red edge band image, the near-infrared band image, the NDVI image, the DSM image, and the device combines them with the sample file to obtain classification result of the green-blue-gray infrastructure corresponding to the target area. It should be noted that, the eCognition software is an intelligent image-analyzing software that adopts an object-oriented information extraction method, and can fully utilize object information (color tone, shape, texture, hierarchy) and information between different classes (related features with a neighboring object, a sub object, and a parent object) for analysis: the Arc GIS software is a software that can be used to collect, organize, manage, analyze, exchange, and publish geographic information. The sample file comprises a training sample and a validation sample.

In some embodiments, step S20 further includes:

step b, generating a mesh image based on a preset mesh spacing, and overlapping the mesh image with the color orthophoto to obtain a color mesh orthophoto.

In this step, the device for classifying the green-blue-gray infrastructure generates the mesh image through the eCognition software based on the preset mesh spacing, and overlaps the mesh image with the color orthophoto corresponding to the target area to obtain the color mesh ortho-photo. For example, relevant researchers set a sampling interval of 11.6 m based on their experience, and propor-tionally reduce the sampling interval based on a correspond-ing size of the mesh image that needs to be generated to obtain the preset mesh spacing. The device for classifying the green-blue-gray infrastructure generates the mesh image based on the preset mesh spacing through the eCognition software, and covers the mesh image on a surface of the color orthophoto to make the mesh image overlapped with the color orthophoto, so as to obtain the color mesh ortho-photo. It can be understood that the mesh image is covered on the surface of the color orthophoto to obtain the color mesh orthophoto. The surface of the color mesh orthophoto is mesh-shaped, wherein each mesh point on the mesh respectively corresponds to different infrastructure on the color mesh orthophoto.

Step c, identifying a mesh-point attribute corresponding to each mesh point in the color mesh orthophoto, and obtaining a training sample based on the mesh-point attri-bute.

In this step, after obtaining the color mesh orthophoto, the device for classifying the green-blue-gray infrastructure identifies the mesh-point attribute corresponding to each mesh point corresponding to the mesh in the color mesh orthophoto through the Arc GIS software, and obtains the training sample based on the mesh-point attribute corre-sponding to each mesh point. It can be understood that the grid point refers to an intersection point formed by a intersection of two line segments in the mesh. Each mesh point in the color mesh orthophoto respectively corresponds to different infrastructure on the color mesh orthophoto. The mesh-point attribute is a type of the infrastructure corre-sponding to the mesh point. 7 types of the infrastructure set by relevant research and development personnel include water bodies, trees and shrubs, grasslands, green roofs, bare lands, buildings, and roads, among them, the water bodies are blue infrastructure, the trees and shrubs, grasslands, green roofs, and bare lands are green infrastructure, and the buildings and roads are gray infrastructure.

Step d, deflecting the mesh image of the color mesh orthophoto to obtain a validation sample.

In this step, after obtaining the training sample, the device for classifying the green-blue-gray infrastructure deflects the mesh of the color mesh orthophoto, optionally the device may deflect the entire mesh in a top, bottom, left, right, top-left, top-right direction, and etc., so as to make the mesh-point attribute corresponding to each mesh point in the mesh different from that corresponding to each mesh point in the training sample, thereby obtaining the validation sample. For example, the device for classifying the green-blue-gray infrastructure deflects the entire mesh in the color mesh orthophoto downwards by one preset mesh spacing, identifies the mesh-point attribute corresponding to each mesh point after the deflection, so as to obtain the corre-sponding validation sample. Optionally, the mesh in the color mesh orthophoto can be deflected in a plurality of directions so as to obtain a plurality of validation samples.

Step e, performing a partition on the image set of the target based on spectral similarity to obtain a shape object: calculating and obtaining a pre-classification result of the green-blue-gray infrastructure based on the training sample in the sample file and a light-wave-band image value of the corresponding shape object.

In this step, the device for classifying the green-blue-gray infrastructure performs the partition on the image set of the target through the eCognition software, and obtains the shape object based on waveband-value similarity of the blue band image, the green band image, the red band image, the red edge band image, the near-infrared band image, the NDVI image, the DSM image in the image set of the target. The device gives the mesh-point attribute of the training sample in the sample file to each shape object, and calculates attribute values of other shape objects without attributes using an algorithm such as random forest, fuzzy classification, Bayesian algorithm and etc. to obtain the pre-classification result of the green-blue-gray infrastructure.

Step f, performing an accuracy evaluation on the pre-classification result of the green-blue-gray infrastructure based on the validation sample in the sample file to obtain an accuracy-evaluation result, and determining a classification result of the green-blue-gray infrastructure based on the accuracy-evaluation result.

In this step, the device for classifying the green-blue-gray infrastructure performs the accuracy evaluation on the pre-classification result of the green-blue-gray infrastructure based on the mesh-point attribute corresponding to each mesh point of the validation sample in the sample file to obtain the accuracy-evaluation result, and determines the classification result of the green-blue-gray infrastructure based on the accuracy-evaluation result.

Furthermore, the step that determining the classification result of the green-blue-gray infrastructure based on the accuracy-evaluation result comprises following steps f1-f3.

Step f1, comparing the accuracy-evaluation result with a preset accuracy to obtain a comparison result.

In this step, the device for classifying the green-blue-gray infrastructure compares the accuracy-evaluation result with the preset accuracy to obtain the comparison result. For example, relevant researchers set the preset accuracy to 0.8 based on actual situations. If the accuracy-evaluation result of the pre-classification result of the green-blue-gray infrastructure obtained by the device for classifying the green-blue-gray infrastructure is 0.7, the comparison result between the accuracy-evaluation result and the preset accuracy is that the accuracy-evaluation result is less than the preset accuracy. If the accuracy-evaluation result of the pre-classification result of the green-blue-gray infrastructure obtained by the device for classifying the green-blue-gray infrastructure is 0.85, the comparison result between the accuracy-evaluation result and the preset accuracy is that the accuracy-evaluation result is not less than the preset accuracy.

Step f2, if the comparison result is that the accuracy-evaluation result is not less than the preset accuracy, then determining the pre-classification result of the green-blue-gray infrastructure as the classification result of the green-blue-gray infrastructure.

In this step, if the device for classifying the green-blue-gray infrastructure obtains the comparison result that the accuracy-evaluation result is not less than the preset accuracy, the device determines the pre-classification result of the green-blue-gray infrastructure as the classification result of the green-blue-gray infrastructure, and provides rainwater-utilization analysis data corresponding to the target area by adopting the classification result of the green-blue-gray infrastructure.

Step f3, if the comparison result is that the accuracy-evaluation result is less than the preset accuracy, then presetting and processing the mesh image and the image set of the target to obtain an optimal mesh image and an optimal image set of the target, and executing following step: overlapping the mesh image with the color orthophoto to obtain a color mesh orthophoto.

In this step, if the device for classifying the green-blue-gray infrastructure obtains the comparison result that the accuracy-evaluation result is less than the preset accuracy, the device presets and processes the mesh image and the image set of the target to obtain the optimal mesh image and the optimal image set of the target. The device overlaps the mesh image with the color orthophoto to obtain the color mesh orthophoto and subsequent steps until the obtained accuracy-evaluation result corresponding to the pre-classification result of the green-blue-gray infrastructure is not less than the preset accuracy.

Furthermore, the step that presetting and processing the mesh image and the image set of the target to obtain the optimal mesh image and the optimal image set of the target comprises:

performing a zoom-out operation on a mesh spacing corresponding to the mesh image to obtain mesh images with a first preset number, and respectively performing a first preset operation on each mesh image to obtain the optimal mesh image.

In this step, the device for classifying the green-blue-gray infrastructure performs the zoom-out operation on the mesh spacing corresponding to the mesh image to obtain mesh images with the first preset number, and respectively performs the first preset operation on each mesh image to obtain the optimal mesh image. For example, the device for classifying the green-blue-gray infrastructure can perform the zoom-out operation on the mesh spacing corresponding to the mesh image to obtain the mesh images with the first preset number based on the preset mesh spacing. Optionally, the device for classifying the green-blue-gray infrastructure increases or decreases the mesh spacing corresponding to the mesh image based on the preset mesh spacing, according to instructions of relevant researchers. When each increase or decrease is in the mesh spacing, the corresponding mesh image is obtained, and ultimately the mesh images with the first preset number is obtained, and then this step stops. Optionally, the device for classifying the green-blue-gray infrastructure classification devices can intelligently set the first preset number, and intelligently increase or decrease the mesh spacing corresponding to the mesh image based on the preset mesh spacing, ultimately obtaining the mesh images with the first preset number. After obtaining the mesh images with the first preset number, the device for classifying the green-blue-gray infrastructure performs a first preset operation on each mesh image, that is, overlaps the mesh image with the color orthophoto for each mesh image. Then the device obtains the color mesh orthophoto and subsequent steps to obtain the accuracy-evaluation result corresponding to the pre-classification result of the green-blue-gray infrastructure corresponding to each mesh image. The device compares the accuracy-evaluation result corresponding to each mesh image with the preset accuracy, and selects the mesh image corresponding to the accuracy-evaluation result that is not less than the preset accuracy. The device selects the mesh image with largest mesh spacing from the mesh image corresponding to the accuracy-evaluation result that is not less than the preset accuracy, the mesh image selected is as the optimal mesh image.

Performing an increase or decrease operation on the number of images in the image set of the target to obtain image sets of the target with a second preset number; and respectively performing a second preset operation on each image set of the target based on the optimal mesh image to obtain the optimal image set of the target.

In this step, the device for classifying the green-blue-gray infrastructure performs the increase or decrease operation on the number of images in the image set of the target to obtain image sets of the target with the second preset number, and respectively performs the second preset operation on each image set of the target based on the optimal mesh image to obtain the optimal image set of the target. For example, the device for classifying the green-blue-gray infrastructure performs the increase or decrease operation on the number of images in the image set of the target to obtain the image sets of the target with the second preset number. Optionally, the device for classifying the green-blue-gray infrastructure performs the increase or decrease operation on the number of images in the image set of the target according to instructions of relevant researchers, and ultimately obtains image sets of the target with the second preset number, and then this step stops. Optionally, the device for classifying the green-blue-gray infrastructure can intelligently set the second preset number, and intelligently perform the increase or decrease operation on the number of images in the image set of the target, ultimately obtaining image sets of the target with the second preset number. In some embodiments, the image set of the target may include: the blue band image, the green band image, the NDVI image, the DSM image; and may also include: the blue band image, the green band image, the red band image, the NDVI image, the DSM image; and may also include: the blue band image, the green band image, the red band image, the near-infrared band image, the NDVI image, the DSM image, etc. The device for classifying the green-blue-gray infrastructure obtains a training sample and a validation sample based on the optimal mesh image and the color orthophoto corresponding to the target area, and respectively performs the second preset operation on each image set of the target, that is, respectively performs a partition operation on each image set of the target to obtain a shape object. The device calculates and obtains the pre-classification result of the green-blue-gray infrastructure and subsequent steps based on the shape object and the training sample in the sample file, so as to obtain the accuracy-evaluation result corresponding to the pre-classification result of the green-blue-gray infrastructure corresponding to each image set of the target. The device selects the image set of the target with highest accuracy evaluation from each image set of the target, as the optimal image set of the target, wherein the accuracy-evaluation result of the image set of the target is not less than the preset accuracy.

In the method for classifying the green-blue-gray infrastructure in the present embodiment, the device for classifying the green-blue-gray infrastructure, obtains a multispectral photo corresponding to a target area, and performs a two-dimensional rebuilding operation on the multispectral photo. Based on a preset resolution, and the multispectral photo, which is performed the two-dimensional rebuilding operation thereon, the device obtains an image set of a target, and a color orthophoto. The device for classifying the green-blue-gray infrastructure generates a mesh image based on a preset mesh spacing, and overlaps the mesh image with the color orthophoto to obtain a color mesh orthophoto. The device for classifying the green-blue-gray infrastructure identifies a mesh-point attribute corresponding to each mesh point in the color mesh orthophoto, and obtains a training sample based on the mesh-point attribute, and then deflects the mesh image in the color mesh orthophoto to obtain a validation sample. The device for classifying the green-blue-gray infrastructure performs a partition on the image set of the target to obtain a shape object. Based on the mesh-point attribute in the training sample of a sample file, and the shape object, the device calculates and obtains a pre-classification result of the green-blue-gray infrastructure. Based on the pre-classification result of the green-blue-gray infrastructure, and the validation sample of the sample file, the device performs an accuracy evaluation to obtain an accuracy-evaluation result. Based on the accuracy-evaluation result, the device determines a classification result of the green-blue-gray infrastructure, thereby improving the accuracy and efficiency for classifying the green-blue-gray infrastructure.

Furthermore, based on the method for classifying the green-blue-gray infrastructure in the first embodiment of the present disclosure, a method for classifying the green-blue-gray infrastructure in the second embodiment of the present disclosure is provided.

The difference between the method for classifying the green-blue-gray infrastructure in the second embodiment, and the method for classifying the green-blue-gray infrastructure in the first embodiment is that, after above-mentioned step S20, the method for classifying the green-blue-gray infrastructure in the second embodiment further comprises:

step g, generating a classification map corresponding to the target area based on the classification result of the green-blue-gray infrastructure, and providing a rainwater-utilization analysis data corresponding to the target area based on the classification map.

In the present embodiment, the device for classifying the green-blue-gray infrastructure generates the classification map corresponding to the target area based on the classification result of the green-blue-gray infrastructure, wherein the classification result of the green-blue-gray infrastructure is obtained based on the mesh image corresponding to the preset mesh spacing, and the image set of the target composed of the blue band image, the green band image, the red band image, the red edge band image, the near-infrared band image, the NDVI image, and the DSM image. Or, the device for classifying the green-blue-gray infrastructure generates the classification map corresponding to the target area based on the classification result of the green-blue-gray infrastructure, wherein the classification result of the green-blue-gray infrastructure is obtained based on the optimal mesh image and the optimal image set of the target. The classification map comprises the infrastructure with 7 types of the target areas: water bodies, trees and shrubs, grasslands, green roofs, bare lands, buildings, and roads. Based on the classification map, the device provides the rainwater-utilization analysis data corresponding to the target area.

In the present embodiment, the device for classifying the green-blue-gray infrastructure generates the classification map corresponding to the target area, based on the ultimately obtained classification result of the green-blue-gray infrastructure of the target area. The classification map comprises the infrastructure with 7 types of the target areas: water bodies, trees and shrubs, grasslands, green roofs, bare lands, buildings, and roads. Based on the classification map, the device provides the rainwater-utilization analysis data corresponding to the target area, so that the classification result of the green-blue-gray infrastructure can provide data for rainwater-utilization analysis corresponding to the target area.

The present disclosure further provides a device for classifying the green-blue-gray infrastructure, which comprises:

an obtaining module, which is configured to obtain a multispectral photo corresponding to a target area, and obtain an image set of a target and a color orthophoto, based on the multispectral photo;

a classifying module, which is configured to obtain a sample file based on the color orthophoto and obtain a classification result of the green-blue-gray infrastructure corresponding to the target area based on the image set of the target and the sample file. Furthermore, the obtaining module further comprises a two-dimensional rebuilding module, which is configured to:

perform a two-dimensional rebuilding operation on the multispectral photo, and obtain an image set of a target, and a color orthophoto based on the multispectral photo performed the two-dimensional rebuilding operation thereon and a preset resolution. Furthermore, the classifying module further comprises a generating module, which is configured to:

generate a mesh image based on a preset mesh spacing, and overlap the mesh image with the color orthophoto to obtain a color mesh orthophoto;

identify a mesh-point attribute corresponding to each mesh point in the color mesh orthophoto, and obtain a training sample based on the mesh-point attribute;

deflect the mesh image in the color mesh orthophoto to obtain a validation sample.

Furthermore, the classifying module is further configured to:

perform a partition on the image set of the target based on spectral similarity to obtain a shape object, and calculate and obtain a pre-classification result of the green-blue-gray infrastructure based on the training sample in the sample file and a light-waveband image value of the corresponding shape object;

perform an accuracy evaluation on the pre-classification result of the green-blue-gray infrastructure based on the validation sample in the sample file to obtain an accuracy-evaluation result, and determine a classification result of the green-blue-gray infrastructure based on the accuracy-evaluation result.

Furthermore, the classifying module is further configured to:

compare the accuracy-evaluation result with a preset accuracy to obtain a comparison result;

if the comparison result is that the accuracy-evaluation result is not less than the preset accuracy, determine the pre-classification result of the green-blue-gray infrastructure as the classification result of the green-blue-gray infrastructure; and if the comparison result is that the accuracy-evaluation result is less than the preset accuracy, preset and process the mesh image and the image set of the target to obtain an optimal mesh image and an optimal image set of the target, and execute following step: overlapping the mesh image with the color orthophoto to obtain a color mesh orthophoto.

Furthermore, the classifying module further comprises an optimization module, which is configured to:

perform a zoom-out operation on a mesh spacing corresponding to the mesh image to obtain mesh images with a first preset number, and perform a first preset operation on each mesh image respectively to obtain the optimal mesh image;

perform an increase or decrease operation on the number of images in the image set of the target to obtain image sets of the target with a second preset number, and perform a second preset operation on each image set of the target based on the optimal mesh image to obtain the optimal image set of the target.

Furthermore, the classifying module further comprises an analysis module, which is configured to:

generate a classification map corresponding to the target area based on the classification result of the green-blue-gray infrastructure, and provide a rainwater-utilization analysis data corresponding to the target area based on the classification map.

The present disclosure further provides a medium.

The medium of the present disclosure is a computer-readable storage medium, on which a classification program for a green-blue-gray infrastructure is stored. When the classification program for the green-blue-gray infrastructure is executed by a processor, the steps of the method for classifying the green-blue-gray infrastructure as described above are implemented.

Among them, the method, implemented when the classification program for the green-blue-gray infrastructure running on the processor is executed, can refer to various embodiments with methods for classifying the green-blue-gray infrastructure of the present disclosure, so no longer repeat here.

It should be noted that in the present disclosure, the terms "comprising", "including", or any other variations are intended to cover non-exclusive inclusion, so that a process, method, item, or system that includes a series of elements includes not only those elements, but also other elements that are not explicitly listed, or elements inherent in the process, method, item, or system. Without further limitations, an element limited by statement "including/comprising one . . . " does not exclude another identical element existing in the process, method, item, or system that includes another identical element.

The serial number of the above embodiments of the present disclosure is only for description, does not represent the merits and demerits of the embodiments.

Through the description of the above embodiments, those skilled in the art can clearly understand that the methods of the above embodiments can be implemented through a software with a necessary universal hardware platform, and certainly, they can also be implemented through a hardware; while in many cases, the former is the better implementation. Based on this understanding, technical solutions of the present disclosure, or portions that contribute to the prior art, essentially can be reflected in a form of a software product, which is stored in one storage medium (such as ROM/RAM, magnetic disc, optical disc) as described above, including a plurality of instructions to enable one terminal device (which may be a mobile phone, a computer, a server, or a network device, etc.) to execute the methods described in various embodiments of the present disclosure.

The above are only some preferred embodiments of the present disclosure and do not limit the protection scope of the present disclosure. Any equivalent structures or equivalent process transformations, or applications directly or indirectly applied to other related technical fields, made using the description and accompanying drawings of the present disclosure, are equally included in the protection scope of the present disclosure.

What is claimed is:

1. A method for classifying a green-blue-gray infrastructure, the method comprising:

obtaining a multispectral photo corresponding to a target area;

obtaining an image set of a target and a color orthophoto based on the multispectral photo;

obtaining a sample file based on the color orthophoto, wherein the sample file comprises a training sample and a validation sample; and obtaining a classification result of the green-blue-gray infrastructure corresponding to the target area based on the image set of the target and the sample file;

overlapping a mesh image with the color orthophoto to obtain a color mesh orthophoto;

identifying a mesh-point attribute corresponding to each mesh point in the color mesh orthophoto;

obtaining a training sample based on the mesh-point attribute; and deflecting the mesh image of the color mesh orthophoto to obtain the validation sample.

2. The method for classifying the green-blue-gray infrastructure according to claim 1, wherein obtaining the image set of the target and the color orthophoto based on the multispectral photo further comprises:

performing a two-dimensional rebuilding operation on the multispectral photo; and obtaining the image set of the target and the color orthophoto based on the multispectral photo after the two-dimensional rebuilding operation and a preset resolution.

3. The method of claim 2, wherein the preset resolution is between 6 cm and 10 cm.

4. The method of claim 3, wherein the preset resolution is substantially 6 cm.

5. The method for classifying the green-blue-gray infrastructure according to claim 1, wherein obtaining the sample file based on the color orthophoto further comprises:

generating the mesh image based on a preset mesh spacing.

6. The method for classifying the green-blue-gray infrastructure according to claim 5, wherein obtaining the classification result of the green-blue-gray infrastructure corresponding to the target area based on the image set of the target and the sample file further comprises:

performing a partition on the image set of the target based on spectral similarity to obtain a shape object;

calculating and obtaining a pre-classification result of the green-blue-gray infrastructure based on the training sample of the sample file and a light-waveband image value of the corresponding shape object;

performing an accuracy evaluation on the pre-classification result of the green-blue-gray infrastructure based on the validation sample of the sample file to obtain an accuracy-evaluation result; and determining the classification result of the green-blue-gray infrastructure based on the accuracy-evaluation result.

7. The method for classifying the green-blue-gray infrastructure according to claim 6, wherein determining the classification result of the green-blue-gray infrastructure based on the accuracy-evaluation result further comprises:

comparing the accuracy-evaluation result with a preset accuracy to obtain a comparison result;

if the comparison result is that the accuracy-evaluation result is not less than the preset accuracy, determining the pre-classification result of the green-blue-gray infrastructure as the classification result of the green-blue-gray infrastructure; and if the comparison result is that the accuracy-evaluation result is less than the preset accuracy, presetting and processing the mesh image and the image set of the target to obtain an optimal mesh image and an optimal image set of the target, and overlapping the mesh image with the color orthophoto to obtain the color mesh orthophoto.

8. The method for classifying the green-blue-gray infrastructure according to claim 7, wherein presetting and processing the mesh image and the image set of the target to obtain the optimal mesh image and the optimal image set of the target further comprises:

performing a zoom-out operation on a mesh spacing corresponding to the mesh image to obtain mesh images with a first preset number;

performing a first preset operation on each mesh image respectively to obtain the optimal mesh image;

performing an increase or decrease operation on the number of images in the image set of the target to obtain image sets of the target with a second preset number; and performing a second preset operation on each image set of the target based on the optimal mesh image to obtain the optimal image set of the target.

9. The method of claim 7, wherein the preset accuracy is set to 0.8 based on actual situations.

10. The method for classifying the green-blue-gray infrastructure according to claim 1, wherein after obtaining the sample file based on the color orthophoto, and obtaining the classification result of the green-blue-gray infrastructure corresponding to the target area based on the image set of the target and the sample file, the method further comprises:

generating a classification map corresponding to the target area based on the classification result of the green-blue-gray infrastructure; and providing a rainwater-utilization analysis data corresponding to the target area based on the classification map.

11. A system for classifying the green-blue-gray infrastructure, wherein the system comprises a memory, a processor, and a program for classifying the green-blue-gray infrastructure stored on the memory and operable on the processor; wherein the steps of the method for classifying the green-blue-gray infrastructure according to claim 1 are implemented when the program is executed by the processor.

12. A non-transitory computer-readable storage medium, on which a program for classifying a green-blue-gray infrastructure is stored; wherein the steps of the method for classifying the green-blue-gray infrastructure according to claim 1 are implemented when the program is executed by the processor.

13. The method of claim 1, wherein deflecting the mesh image of the color mesh orthophoto to obtain the validation sample, deflects an entire mesh in the color mesh orthophoto downward by one preset mesh spacing.

14. A device for classifying a green-blue-gray infrastructure, the device comprising:

an obtaining module configured to:

obtain a multispectral photo corresponding to a target area, and obtain an image set of a target, and a color orthophoto based on the multispectral photo; and a classifying module configured to:

obtain a sample file based on the color orthophoto, wherein the sample file comprises a training sample and a validation sample, obtain a classification result of the green-blue-gray infrastructure corresponding to the target area based on the image set of the target and the sample file, overlap a mesh image with the color orthophoto to obtain a color mesh orthophoto, identify a mesh-point attribute corresponding to each mesh point in the color mesh orthophoto, obtain a training sample based on the mesh-point attribute, and deflect the mesh image of the color mesh orthophoto to obtain the validation sample.

* * * * *